United States Patent [19]
Boatwright et al.

[11] Patent Number: 5,291,547
[45] Date of Patent: Mar. 1, 1994

[54] CALL-DISPOSITION ANALYZER

[76] Inventors: John T. Boatwright, Rte. 4, Box 437, Rollins Rd., Hopkinton, N.H. 03229; Charles E. Boatwright, 120 Fisherville Rd., #61, Concord, N.H. 03303

[21] Appl. No.: 853,934

[22] Filed: Mar. 19, 1992

[51] Int. Cl.⁵ .................. H04M 15/16; H04M 15/28
[52] U.S. Cl. .................... 379/113; 379/120; 379/119; 379/130; 379/140
[58] Field of Search ............... 379/113, 111, 116, 119, 379/124, 135, 139, 130, 120, 140

[56] References Cited
U.S. PATENT DOCUMENTS

| | | | |
|---|---|---|---|
| 4,270,024 | 5/1981 | Theis et al. | 379/113 |
| 4,825,465 | 4/1989 | Ryan | 379/100 X |
| 5,048,079 | 9/1991 | Harrington et al. | 379/112 X |
| 5,138,658 | 8/1992 | Carter et al. | 379/413 |

Primary Examiner—Stephen Chin
Assistant Examiner—Paul Loomis
Attorney, Agent, or Firm—Cesari and McKenna

[57] ABSTRACT

A call-disposition analyzer (10) for determining whether calls placed by way of a private branch exchange (PBX) (12) have been completed employs current sensors (22) to monitor the trunk lines (16) that the PBX (12) uses. It thereby records the telephone numbers dialed over the trunk lines (16). It also detects supervisory and voice signals on the trunk lines (12) so as to determine of the call's disposition—i.e., typically, so as to determine whether the call went through successfully. It stores in a memory (60) the call-disposition estimate and tags it with the telephone number that was dialed to make the call. Subsequently, when the PBX (12) transmits a station-message data record (SMDR) for that call, the call-disposition analyzer (10) scans the record for a sequence of digits that match or nearly match any of the telephone numbers that it has stored, and it either forwards that SMDR to a call-accounting system (20) or withholds the SMDR in accordance with the call-disposition estimate tagged with the telephone number that matches or nearly matches a sequence in the SMDR. The call-disposition analyzer thus does not require information concerning the specific internal arrangement of the SMDR format that the PBX employs.

10 Claims, 6 Drawing Sheets

CALL-DISPOSITION ANALYZER

BACKGROUND OF THE INVENTION

The present invention is directed to telephone equipment and in particular to call-disposition analyzers.

Many offices, hotels, and so forth have private branch exchanges (PBXs) for making connections between telephones at the local premises and trunk lines that connect the local premises to the public telephone network. Such equipment primarily performs switching functions, but many types additionally generate data, in the form of station message detail records ("SMDR records"), that can be used by call-accounting and other systems to keep track of various aspects of the telephone traffic that the PBX handles.

In the case of a hotel, one of the ways to which the information contained in the SMDR records is put to use is to enable the hotel to recover the cost of its customers' toll calls. Unfortunately, although the SMDR records do report PBX usage quite effectively, they are not typically arranged to indicate whether a given use resulted in a successful telephone call. As a result, the hotel may charge a guest for calls that were attempted but not completed. This affects guest relations adversely. Conversely, by treating all usages of less than, say, forty-five seconds as unanswered calls, the hotel can fail to obtain reimbursement for a call for which it is required to pay.

The obvious solution to this problem, of course, is to provide the PBX equipment with circuitry for determining whether the calls are completed. The PBX could then include the resulting information in the SMDR records. But most PBX users do not need this added capability and do not want to pay for it, so most PBX equipment does not include it. Moreover, most hotels have already made a considerable investment in their PBX equipment and would therefore be reluctant to replace it even to obtain the extra capability.

To deal with this problem, telephone-equipment manufacturers have produced "call-disposition analyzers" or "answer supervision devices," which can be installed on existing PBXs. A call-disposition analyzer monitors a PBX's trunk lines as well as the lines by which the PBX sends SMDR records to the hotel's call-accounting system. From the signals thus observed, the call-disposition analyzer infers the "disposition" of the call—i.e., it infers (at least) whether the call was completed. For instance, the call-disposition analyzer may monitor a given trunk line to detect various sequences of dial, supervisory, and voice signals that are symptomatic of call completion. Interposed between the PBX and the call-accounting system, it may then withhold the next SMDR record that designates that trunk line if the call-completion-identifying sequence did not appear; i.e., the call-accounting system may receive records only for completed calls.

This approach is quite effective, and it enables the hotel to recover its toll-call costs effectively without improperly charging guests. Unfortunately, the call-disposition analyzers currently available are somewhat elaborate and thus expensive, and they tend to be justified for only the largest hotels, i.e., those that have more than, say, two hundred rooms. Most hotels are smaller than this.

A major part of the reason for their relatively high cost is the complexity of the circuitry and programming required to infer call completion. This complexity results largely from the lack of uniformity among the SMDR formats used by the various types of PBX systems currently in use. A commercial call-disposition analyzer must be manufactured to include programming that makes it compatible with all or most of the types of PBXs on which it might be installed, and, when it actually is installed, it must be informed of the particular type of PBX with which it is to operate. Even these measures are not always adequate, moreover, since PBX manufacturers are not unfailingly so obliging as to notify call-disposition-analyzer manufacturer of SMDR-format changes.

Another contributor to call-disposition-analyzer cost is the need to monitor the trunk lines by which the PBXs are connected to the telephone network. Lines connected to the telephone network often are highly susceptible to noise. This noise usually does not detract significantly from actual telephone use; it contains mostly common-mode components, while the telephones operate on difference-mode signals. But the common-mode noise often results in significant voltages between the public-network ground and the monitoring-equipment ground, and such voltages can drive trunk-line-monitoring voltage sensors to distortion if measures are not taken that typically add to the system cost.

SUMMARY OF THE INVENTION

The present invention is a call-disposition analyzer that can be manufactured more inexpensively than prior-art analyzers. Unlike prior-art call-disposition analyzers, which must "know" the SMDR formats used by the particular PBXs on which they are installed, an analyzer that embodies one aspect of the present invention matches the trunk-line-derived disposition estimate for a call with the call's SMDR by searching through the SMDR record for the destination telephone number that the analyzer observed on the trunk line when it made the estimate. The occurrence of a given telephone number in an SMDR record can be detected without a priori knowledge of the SMDR format, so a call-disposition analyzer that employs this aspect of the present invention does not suffer the complication that arises from the need to "know" the PBX type in order to identify the trunk line with which each SMDR record is associated. That is, a commercial unit is not required to incorporate a library of PBX types and associated SMDR formats.

In accordance with another aspect of the invention, the call-disposition analyzer monitors the trunk lines by sensing the currents that they carry, not by sensing their voltages. By employing appropriate isolation, this type of monitoring can be performed in a simple manner without the vulnerability to the common-mode-voltage-induced distortion from which previous methods can suffer.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
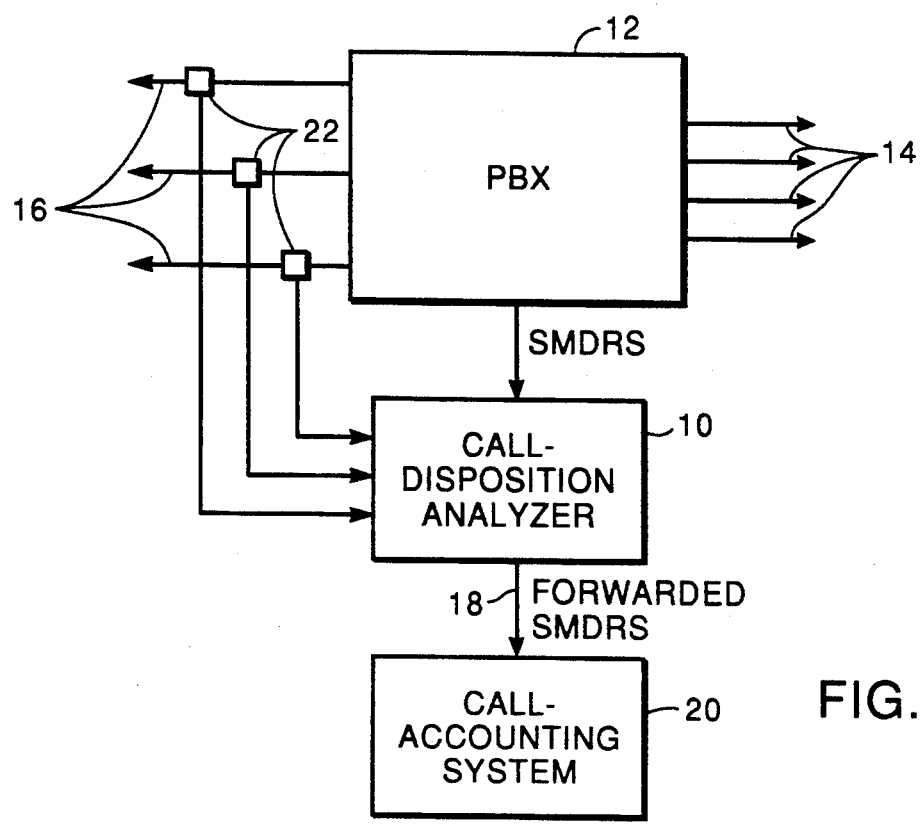
FIG. 1 is a block diagram of a private telephone network that employs the teachings of the present invention.

FIG. 1 depicts in block-diagram form the typical arrangement of a call-disposition analyzer 10. It is employed in connection with private-branch-exchange (PBX) equipment 12, whose purpose is to provide connections between internal lines 14 and trunk lines 16 in the public telephone network.

In performing its operations, the PBX 12 accumulates information concerning the connections that it has made and sends the information in the form of SMDR records by way of lines 18 to a call-accounting system 20. In systems that do not include call-disposition analyzers, this connection between the PBX and the call-accounting system 20 is usually direct. The call-disposition analyzer 10 is interposed in this otherwise direct connection so as to have an effect on SMDR-record reception. In principle, a call-disposition analyzer can affect the reception in any way that indicates whether the call represented by the SMDR record has been completed. In practice, they usually affect reception by simply forwarding the SMDR records that represent completed calls but withholding those that do not, and this is the way in which the illustrated analyzer 10 will be described below. But we have additionally designed an analyzer embodying the present invention that forwards all SMDRs but modifies them so that they include call-disposition indications.

The call-disposition analyzer 10 infers the call disposition from information that it obtains by using trunk monitors 22 to monitor the trunk-line signals. The logical basis on which the disposition estimate is made is not critical to the present invention, and any of a number of known approaches can be employed. In accordance with the broader aspects of the invention, moreover, the type of monitor 22 employed is not critical, either. If the lines 16 carry digital signals, the monitors will typically be conventional bridge interfaces. Bridge circuits can be used for analog lines, too. In accordance with one aspect of the invention, however, the trunk monitors 22 used for analog lines are current sensors, and this affords considerable circuit simplification, as will now be explained.

Figure 2:
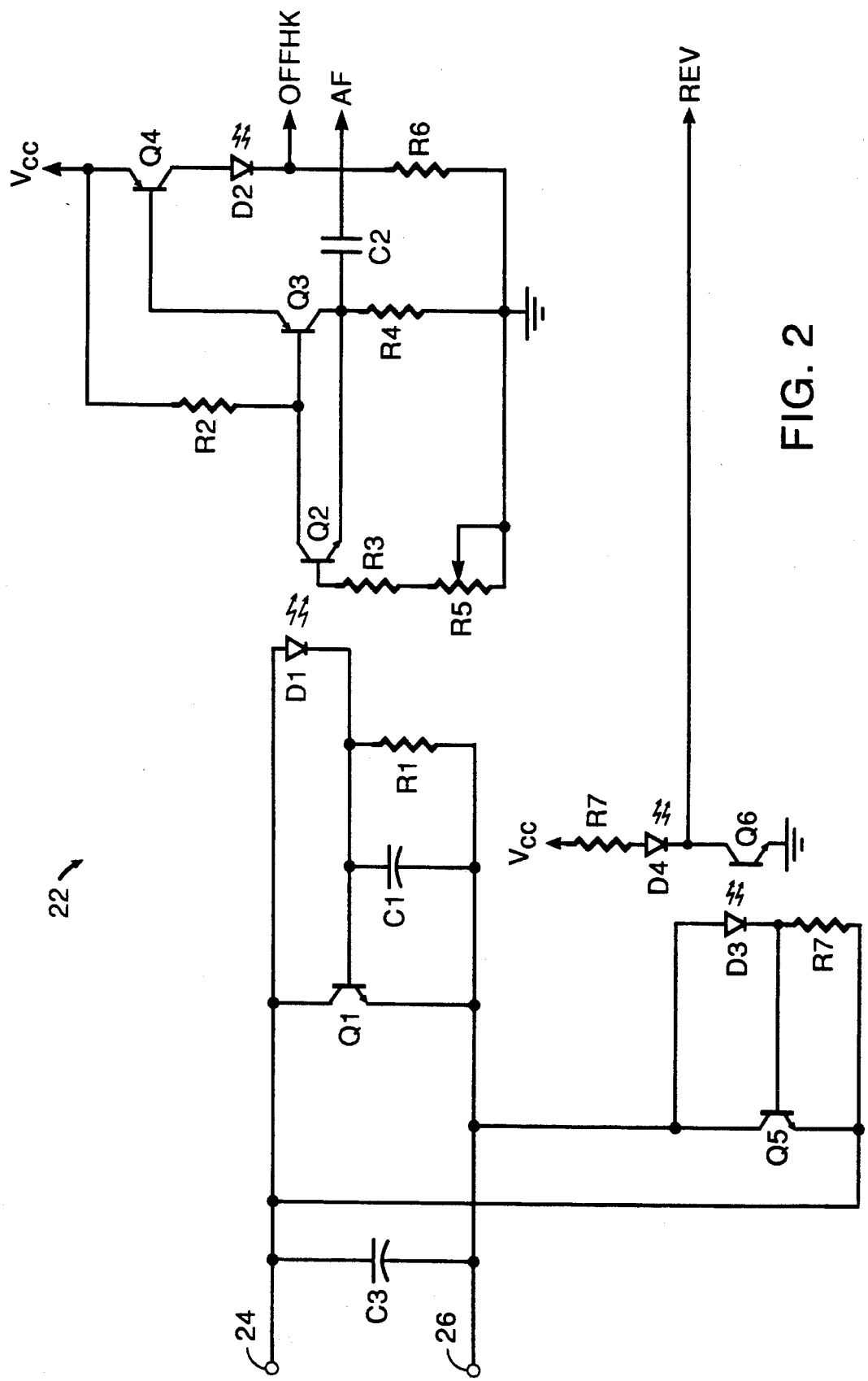
FIG. 2 is a schematic diagram of one of the current sensors depicted in FIG. 1.

FIG. 2 depicts a current sensor 22 that is interposed in one of the trunk lines 16. Terminal 24 is connected to the trunk line's tip conductor, while terminal 26 is connected to the PBX terminal to which that conductor would otherwise be connected. This causes the trunk-line current to flow through an electrical-to-optical converter that, in the illustrated embodiment, includes an ordinarily forward-biased light-emitting diode ("LED") D1 and a low-resistance (e.g. 68 Ω) resistor R1. When the line is not connected to an off-hook telephone set, of course, the current that flows through the conductor is negligible, but an off-hook condition typically causes at least 21 mA to flow. Part of this current flows through light-emitting diode D1, which emits light that is sensed, in a manner that will be described directly, to monitor various characteristics of the trunk-line signal.

Beyond a certain DC level, which indicates that the line is connected to off-hook equipment, the output of interest is the AC signal that is superimposed on the DC level. Since the light-intensity output of LED D1 is a non-linear function of LED current, it is desirable for that diode's DC operating point in the off-hook condition to be kept relatively stable. But the off-hook trunk-line DC current level varies greatly with, e.g., distance to the public-network central office. To make sure that a given AC current in the trunk line 16 results in an optical-signal AC component that is largely independent of trunk-line current, therefore, a transistor Q1 is wired in parallel with the light-emitting diode D1 and resistor R1, whose voltage appears across the base-emitter junction of transistor Q1. When the current flowing through the light-emitting diode D1 reaches approximately 10 mA (which is the level that the illustrated embodiment employs to distinguish between on- and off-hook conditions), the voltage across resistor R1 is great enough to cause transistor Q1 to begin to conduct, and any significant additional DC current above the 10-mA level is diverted through Q1. So long as the trunk line is connected to off-hook equipment, therefore, the DC current flowing through the light-emitting diode D1 is stabilized at 10 mA, and that LED thus maintains a stable operating point for transmission of the small-signal current variations that part of its purpose is to sense.

To prevent transistor Q1 from itself responding to the AC signals and thus preventing the D1 output from being sensitive to them, a filter capacitor C1 bridges the current-sensing resistor R1 so that the LED-current signal is subjected to a low-pass filter in generating the Q1 base voltage. The filter's half-power point is approximately 300 Hz. High-frequency current components accordingly flow through diode D1 instead of through the bypass transistor Q1. Advantageously, transistor Q1 nonetheless draws most of the power-line-frequency current component that might appear on the trunk line. That component is therefore significantly attenuated in the transmitted signal.

At the other end of the spectrum, the entire electrical-to-optical converter is protected from potentially damaging current transients by a small-valued capacitor C3, whose capacitance is low enough not to affect the circuit's operation at the frequencies of interest but high enough for capacitor C3 to act as a short circuit to the frequency components that predominate in such transients.

Note that all of this is accomplished in an electrical-to-optical converter that is totally passive in the sense that it requires no power other than that which it obtains from the trunk-line current. Since it needs no local power supply, it has no need for special measures to enable it to withstand the potentially large potential differences that might otherwise develop between the trunk line and a power-supply ground. The local power needed for amplification is applied instead to an optical-to-electrical converter that is electrically isolated from the electrical-to-optical converter and thus from the trunk line.

The optical-to-electrical converter includes a light-sensitive transistor Q2 appropriately biased by fixed resistors R2, R3, and R4 and variable resistor R5. Transistor Q2 conducts current whose magnitude is a function of the intensity of D1's optical output. The voltage across resistor R2 caused by the resultant current flow appears across the series combination of the base-emitter junctions of two further transistors Q3 and Q4. When the trunk line is connected to off-hook equipment, this voltage is enough to cause transistor Q4 to saturate; i.e., the current that flows through resistor R6 results in a high DC level of an OFFHK signal to indicate an off-hook condition. In the illustrated embodiment, the R6 branch also includes a light-emitting diode D2 on an indicator panel (not shown) to indicate that the associated trunk line is connected to off-hook equipment.

At the same time, the R2 voltage applied to the base of Q3 controls that transistor's collector current, which causes a voltage across R4 that responds to the D1 output. The high-frequency components of the resulting signal are AC coupled through capacitor C2 to produce the input AF to subsequent signal-processing equipment, which will be described below. Although the relationship between the R2 voltage and the Q3 collector current is non-linear, negative feedback tends to linearize the small-signal relationship between the D1 current and the R4 voltage. Specifically, resistors R3 and R5 provide a charge-carrier leakage path that reduces the current-transfer ratio of the D1-Q2 combination. Since the R4 voltage is applied to the emitter of transistor Q2, the voltage across, and thus the leakage through, the R3-R5 path increases when Q2 conduction increases, and the negative feedback represented by the resultant reduction in the current-transfer ratio reduces nonlinearity in accordance with conventional negative-feedback principles.

Resistor R5 is variable so that adjustments can be made to accommodate manufacturing variations in D1 and Q2.

Some central offices signal that a call has been answered by reversing trunk-line current. To take advantage of this indication of a call completion, the current sensor of FIG. 2 includes a further light-emitting diode D3 and series resistor R7 wired anti-parallel to diode D1 and resistor R1 so as to detect current flow in the opposite direction. To prevent excess current flow in light-emitting diode D3, a transistor Q5, which operates analogously to transistor Q1, is provided so that a current reversal results in a flow of only 10 mA through light-emitting diode D3.

The resultant light turns on light-sensitive transistor Q6, which accordingly causes a reversal-indicating LED D4 to shine. At the same time, a REV signal at terminal 32 goes low to notify subsequent circuitry of the reversal in current flow. The monitor signal that the trunk monitor 22 of FIG. 2 generates is thus a vector signal comprising two discrete-valued components, OFFHK and REV, and a continuous-valued component, AF. Subsequent circuitry processes this vector signal to make its disposition estimate.

Figure 4A:
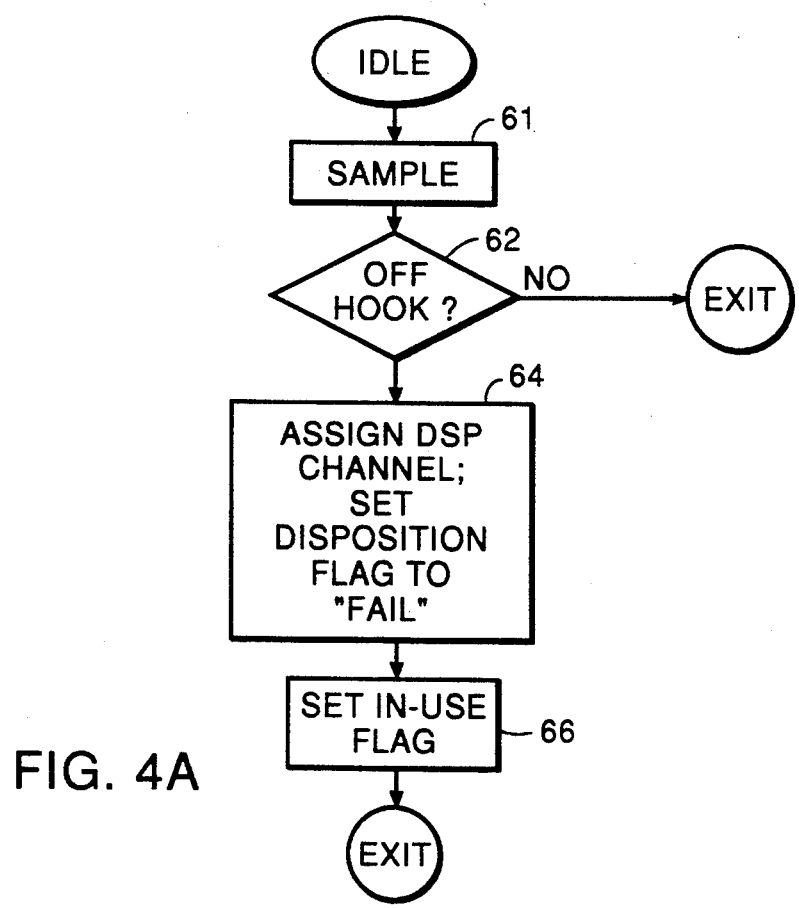
FIGS. 4A and 4B are flow charts depicting scan routines that the call-disposition analyzer follows.
Figure 3:
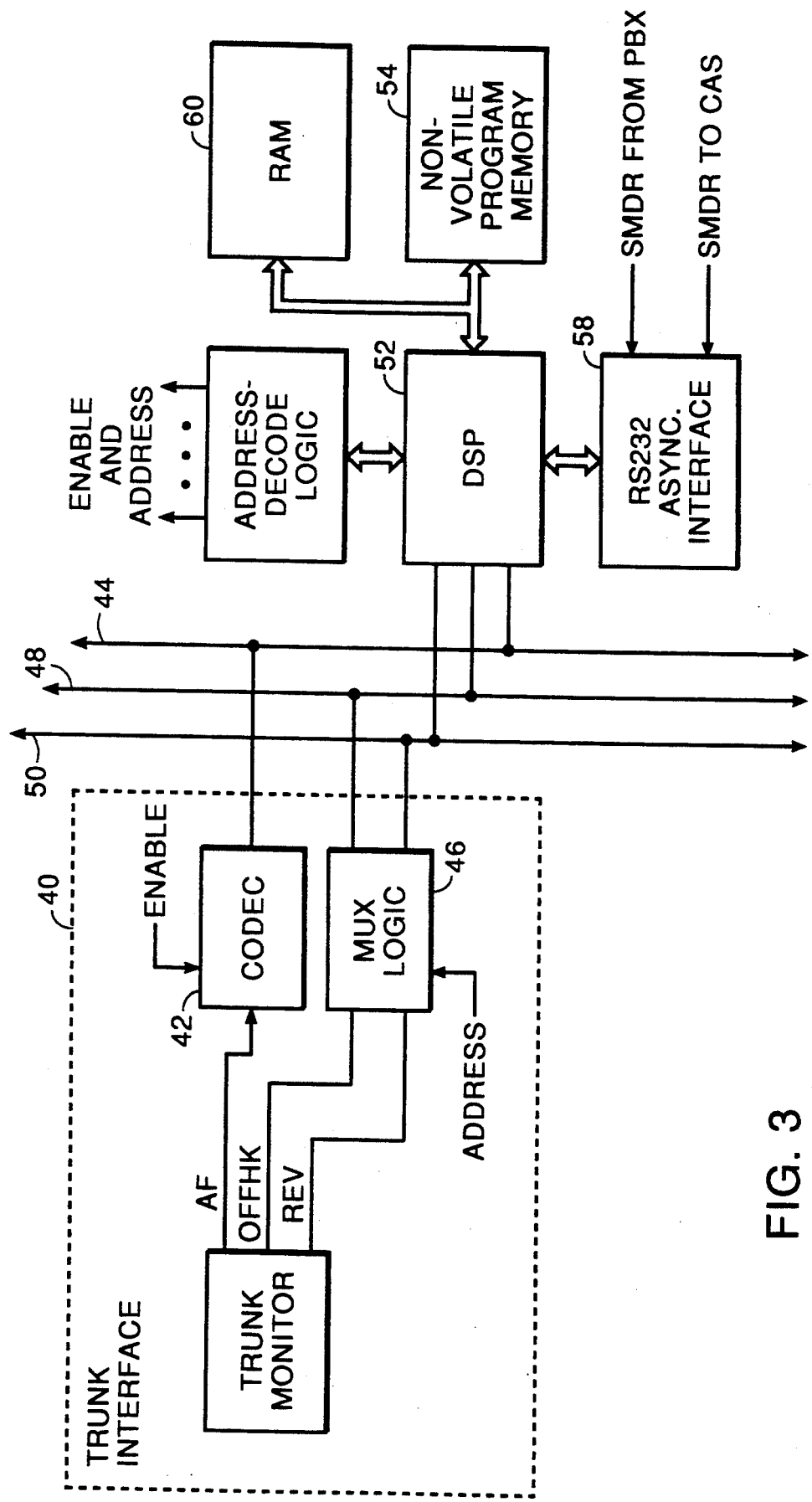
FIG. 3 is a more-detailed block diagram of a part of the call-disposition analyzer of FIG. 1.

As was mentioned above, the particular manner in which the analyzer derives its disposition estimates is not critical. Accordingly, FIGS. 3, 4 and 5 depict one estimation approach in only a highly simplified manner. Although it was convenient to depict the trunk monitors 22 separately from the call-disposition analyzer 10 in FIG. 1, I actually consider them part of it. In particular, each is part of a respective trunk interface that the call-disposition analyzer includes for each trunk. One of these, interface 40, is depicted in FIG. 3. Trunk interface 40 as depicted in FIG. 3 is an interface for an analog trunk line. It includes a coder/decoder ("codec") 42, which receives the continuous-valued component AF of the corresponding monitor signal and converts it to a pulse-code-modulated version thereof, which it imposes on a PCM bus 44 when it receives an associated ENABLE signal generated in a manner that will shortly be described. Similarly, a multiplexer logic circuit 46, so called because it acts in concert with similar circuitry in the trunk interfaces associated with the other trunks to form a composite multiplexer, applies the OFFHK and REV signals to OFFHK and REV buses 48 and 50 when it receives address signals selecting the trunk with which it is associated. If interface 40 were instead an interface to a digital line, it would instead be a bridging interface that produces the desired pulse-code-modulated signal directly. An interface to a digital line would typically time-multiplex the OFFHK and REV signals on a single line with the pulse-code-modulated AF signal. All of the other trunk interfaces 40 (not shown) are similarly connected to common bus lines 44, 48, and 50, but only one applies its output to a bus line at any given time, as will be explained below.

Those skilled in the art will recognize that the analysis and control functions to be described below can readily be provided by many types of existing circuits; implementations based on existing separate microprocessors and ancillary circuitry will readily come to mind. For the sake of example, however, I will describe an implementation, which I have employed, that is based on a commercially available digital signal processing circuit, namely, the Analog Devices 2100 Series.

The digital signal processor 52 runs routines contained in non-volatile program memory 54 by which it cycles through a number of states. In accordance with these routines, it applies encoded control signals to address-decode logic 56, which responds by generating the respective ENABLE and common ADDRESS signals to codec 42 and multiplexer logic 46 in trunk interface 40 and to similar circuitry in the other trunk interfaces so that the interfaces take turns applying their outputs to bus lines 44, 48, and 50, which the DSP monitors. The DSP 52 also receives from an RS-232C asynchronous interface circuit the SMDR signals that the PBX 12 sends to it in the conventional RS-232C format. In accordance with criteria that will be described presently, the digital signal processor 52 determines whether to forward each SMDR record, and it applies selected SMDR records to the interface circuit 58 for retransmission in the RS-232C format to the call-accounting system 20.

More specifically, the digital signal processor 52 continually monitors the OFFHK outputs of all of the trunk interfaces 40 by causing each in turn to impose upon the OFFHK bus 48 its respective OFFHK value. In the illustrated embodiment, this value is sampled once every 7 milliseconds for each trunk, and the result of the sampling is stored in a read/write memory 60, which keeps a short record of the most-recent samples for each trunk as well as some status information that will be introduced as the description proceeds.

For each trunk line, the digital signal processor 52 runs a separate group of routines. The following discussion will treat only the routines that are associated with a single trunk, but it should be recognized that the digital signal processor 52 concurrently runs similar routines for other trunk lines that FIG. 4 depicts.

When the analyzer has arrived at a disposition estimate for a call on a given trunk, it releases the DSP channel, thereby freeing its resources for other trunks, but it thereafter still monitors the OFFHK signal for that trunk to determine when OFFHK goes low and thereby indicates that the call for which it has already made a estimate is finished. On its first sample after OFFHK goes low, the digital signal processor 52 enters the routine depicted in FIG. 4A, which controls monitoring of the OFFHK bus to determine when a new call is being attempted; i.e., the FIG. 4A routine is in control so long as the trunk remains idle.

Each time an OFFHK sample is taken, as block 61 indicates—i.e., once every 7 msec—the digital signal processor 52 performs the step represented by block 62, in which it determines, by inspecting the accumulated record of the OFFHK samples for that trunk, whether that trunk is connected to off-hook equipment. Although this determination could instead be made simply in accordance with whether the OFFHK signal is asserted currently, it is better for an off-hook condition to be inferred only if OFFHK has been asserted for a minimum number of consecutive samples; this filters out noise. If the digital signal processor 52 does not infer that the trunk has been connected to off-hook equipment, then the routine of FIG. 4A has been completed, although the processor 52 runs it again when it takes the next sample.

If an off-hook condition has been detected, on the other hand, the routine proceeds to step 64, in which it enters into read/write memory 60 a disposition flag of "fail" for that trunk. This is not the final estimate for the currently monitored call, but it will be if no subsequent change occurs, as will become apparent as the description proceeds. The digital signal processor 52 also arranges itself at this time to form a signal-processing channel, which it assigns to the trunk line and operates concurrently with channels that it needs for any other trunk line. In so doing, the digital signal processor 52 changes the cyclically occurring signals that it applies to the address-decode logic 56 so as to cause that logic periodically to enable the codec 42 associated with the off-hook trunk line. The resulting samples of the AF signal from that trunk line are the input to the newly implemented signal-processing channel. The digital signal processor sequentially enables the codecs for all of the trunks to which it has allocated channels, thereby creating a serial PCM highway; it makes one scan of all of the trunks every 125 msec sampling the AF signal of each trunk at an 8 kHz rate.

With the new channel allocated, the status stored for that trunk changes from "idle" to "in-use," as block 66 indicates, and the running of the routine in response to the most-recent sample is finished. On the next sample, the digital signal processor 52 will not return to the FIG. 4A routine; the "in-use" status will cause it to enter the routine depicted in FIG. 4B. This routine samples OFFHK, too, as block 68 indicates, and if the record for that trunk does not contain a long enough sequence of low-value OFFHK samples to indicate that the user has in fact hung up, the routine proceeds to the step of block 70. At this step, the routine branches on the value of the REV signal, which is asserted when the trunk current reverses, as some central offices cause it to do when the call is actually answered. (Again, the criterion typically would not be simply a single assertion-indicating sample, because such an arrangement would be more vulnerable to noise than one that requires a sequence.)

If no reversal has occurred, the routine proceeds to step 72, where it branches on the value of a timer that indicates the length of time for which that particular trunk line has been in the off-hook condition. The illustrated embodiment employs such an expedient in order to use signal-processing capacity efficiently. If a trunk has remained connected to off-hook equipment for at least, say, 90 seconds, the system concludes that the call has been completed and sets the trunk's estimate flag to "pass," as block 74 indicates. If a complete telephone number has been dialed, it then stores this disposition estimate as the final estimate for the call in a manner that will be explained in more detail below, and it releases the channel allocated to that trunk, as blocks 75 and 76 indicate.

In addition to its other tasks, the channel allocated in step 64 monitors the AF signal for dual-tone multifrequency (DTMF) dial signals. Step 78 of FIG. 4 represents accessing the channel output to determine whether DTMF data currently are being received. If they are, or if rotary-dial signals are being received, as can be determined by monitoring the OFFHK signal, then the digit thus dialed is stored in step 80. In any event, a determination is made, as step 82 indicates, of whether enough digits have been compiled to make a complete telephone number (or some smaller number of digits that will be adequate to identify the call later). If not, the routine terminates at this point, to be started again 7 msec later, when the trunk's OFFHK and REV signals are again sampled. If enough digits have been accumulated, on the other hand, the routine passes a signal to the channel allocated for that trunk so that it enters a state in which it monitors the AF signal for additional components. Block 84 represents this step. The routine then ends as before, to be recalled 7 msec later.

Figure 4B:
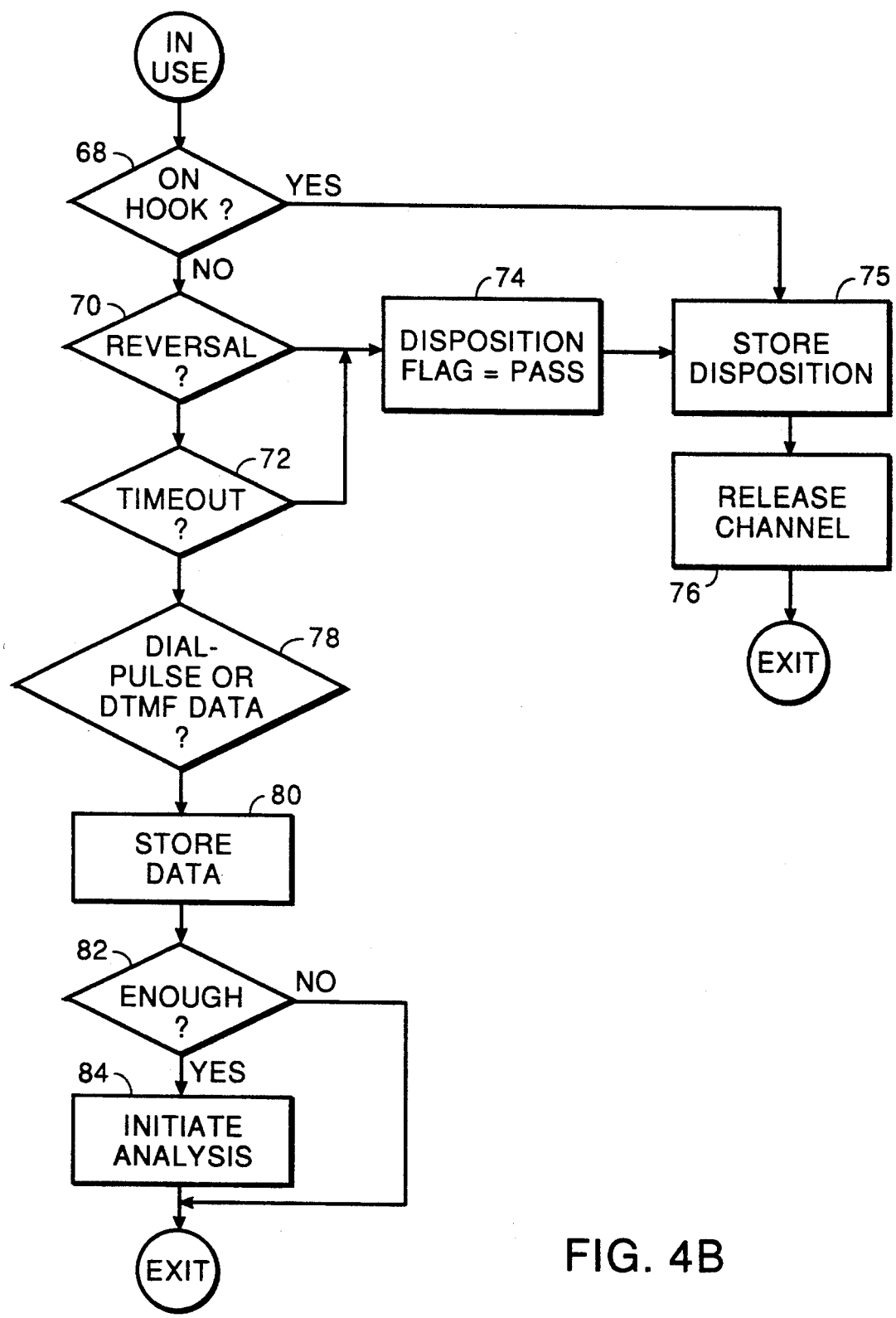
Figure 5:
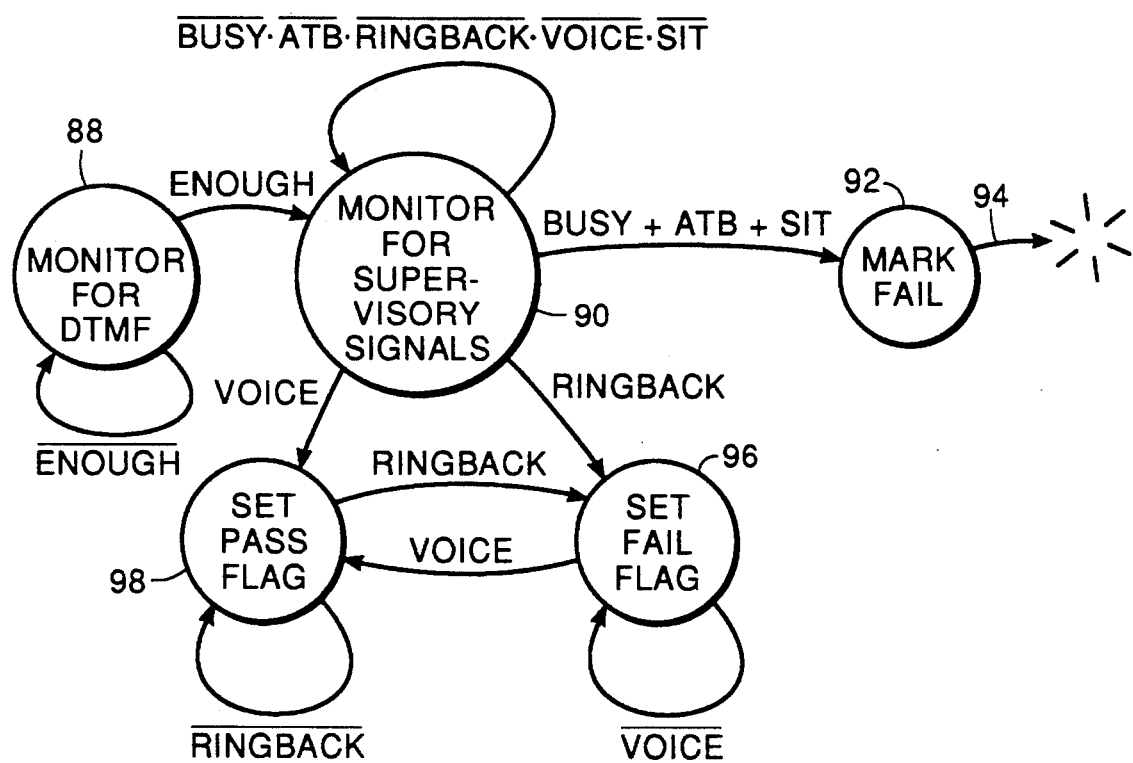
FIG. 5 is a state-transition diagram representing the manner in which the analyzer responds to voice and supervisory signals.

Dynamic allocation of a digital-signal-processing channel means that the digital signal processor implements a bank of filters associated with the trunk to which the channel is allotted, and those filters process the samples taken at 125-msec intervals concurrently with the 7-msec interval sampling upon which the routine of FIG. 4 is primarily based. FIG. 5 is a high-level state-transition diagram that represents in simplified state-machine form the control of this aspect of the channel's operation. The filters monitor the AF signal for various frequencies of interest and record the results in accordance with various criteria. As FIG. 5 represents by state 88, for instance, the frequencies for which the filters initially monitor are those employed in the DTMF code. The digital signal processor indicates whether a legal DTMF digit currently is being received and identifies what that digit is. This is the output that the routine of FIG. 4B interrogates in step 78.

When the FIG. 4B routine determines, by interrogating the channel output for tone-dial results—or by itself observing the OFFHK band for rotary-dial results—that enough digits have been accumulated, it causes the channel to switch to state 90, in which it monitors the sampled AF signal instead for ringback, busy, ATB, SIT, and voice signals. Ringback tells the caller that the other party is ringing and is typically represented in North America by a tone pair of 440 Hz and 480 Hz that is alternately on for 2 seconds and off for 4 seconds. A busy signal, of course, indicates that the line is busy and is represented in North America by a tone pair of 480 Hz and 620 Hz in alternate on and off periods of 0.5 second each. ATB and SIT signals indicate that the network cannot reach the station to which the call was directed, either because of facilities limitations (ATB) or because no equipment currently is associated with the dialed number (SIT). ATB is represented by a tone pair of 480 Hz and 620 Hz for 0.3 second that alternates with 0.2-second silent intervals. The latter, SIT signal is a sequential triplet of 950, 1400, and 1800 Hz having durations of 330 milliseconds apiece. If signals that do not meet any of the foregoing specifications nonetheless have rms levels between −9 dbm and −36 dbm, as measured at the trunk attachment point, within the 300-to-3400-Hz spectrum, the illustrated embodiment concludes that voice signals are being transmitted over the line.

Unless the channel is released as a result of the action of the FIG. 4B routine, it remains in state 90 so long as it detects none of the five types of signals just described. If it detects the busy, ATB, or SIT signal, the channel proceeds to state 92, in which it marks the current call as having failed. That is, it stores in a call-recording part of the read/write memory 60 a call-failed indication together with a tag consisting, according to the present invention, of the digits stored in step 70 of FIG. 4B. That is, it indicates that an attempted call to that telephone number failed. (As was stated before, the stored number can be a complete telephone number, but it may make the system more robust—with little loss of accuracy—to require less than all of the digits typically necessary for a complete telephone number.) Having completed this task, the channel closes down, and the corresponding state machine can be thought of as going out of existence, as arrow 94 of FIG. 5 indicates.

The transition is different if the channel detects voice or ringback signals. These place the state machine in state 96, in which it sets a temporary, holding flag to a "fail" state. Again, this does not mean that the call has been declared a failure; it means only that it will be declared a failure if the concurrently running routine of FIG. 4B detects an on-hook condition while the channel is in state 96. In that event, the FIG. 4B routine performs steps 75 and 76, in which the current disposition estimate is stored and the channel released. For the sake of simplicity, FIG. 5 omits this mechanism for leaving state 96.

Without interruption from the concurrently operating routine of FIG. 4B, however, the state machine remains in state 96 unless the channel's filter bank detects voice signals in accordance with the specifications given above. If that happens—or if voice signals are detected in state 90 even without the previous detection of ringback signals—the state machine assumes state 98, in which it sets the temporary flag to a "pass" value. This will become the disposition estimate and will be stored with the accumulated telephone number if the FIG. 4B routine detects an on-hook condition in its step 68. But if the FIG. 5 state machine again detects ringback without having been interrupted by the FIG. 4B routine, it concludes that the voice signals did not indicate that the call went through but instead that they represented, say, the caller's speaking to someone in the same room, and it returns to state 96. Thus, the state machine can toggle between states 96 and 98, and the call-disposition estimate recorded for the call will be that of the state that then prevails if the caller hangs up as detected by step 68 of FIG. 4B.

As was indicated above, however, the FIG. 4B routine may release a channel for other reasons. If it detects a current reversal in step 70, for instance, it unconditionally sets the disposition estimate to pass, stores that disposition, and releases the channel. Therefore, even if the state machine is in state 96 because no voice has yet been detected, the system takes advantage of the current-reversal signal available in some systems to conclude that the call has been completed, and there is no need for the channel to remain allocated to that trunk any longer.

In the illustrated embodiment, an unconditional pass indication is also stored when a timer, whose interval is typically 90 seconds, times out, as blocks 72, 74, 75 and 76 of FIG. 4B indicate. In the illustrated embodiment, therefore, the system assigns a "pass" disposition estimate to a call even when only ringback signals have been received if the caller does not hang up within 90 seconds. Of course, this feature may not always be preferred, since it can result in a hotel's charging a customer for a call that did not go through, but in many installations it is desirable to charge customers for tying up a trunk line unnecessarily, and the illustrated embodiment is intended for such installations. For other installations, of course, different criteria, including other time out values, can be employed.

Indeed, the same is true of most other aspects of the foregoing approach to arriving at disposition estimates, which is merely exemplary. The important thing is that the disposition estimate be stored together with a tag representing the dialed telephone number, or at least a part of it. The advantage of so tagging the disposition estimates—as opposed to tagging them with, for instance, the trunk number—is that it enables disposition estimates to be assigned to the proper SMDRs in most cases without the need to know the SMDR format in detail.

Figure 6:
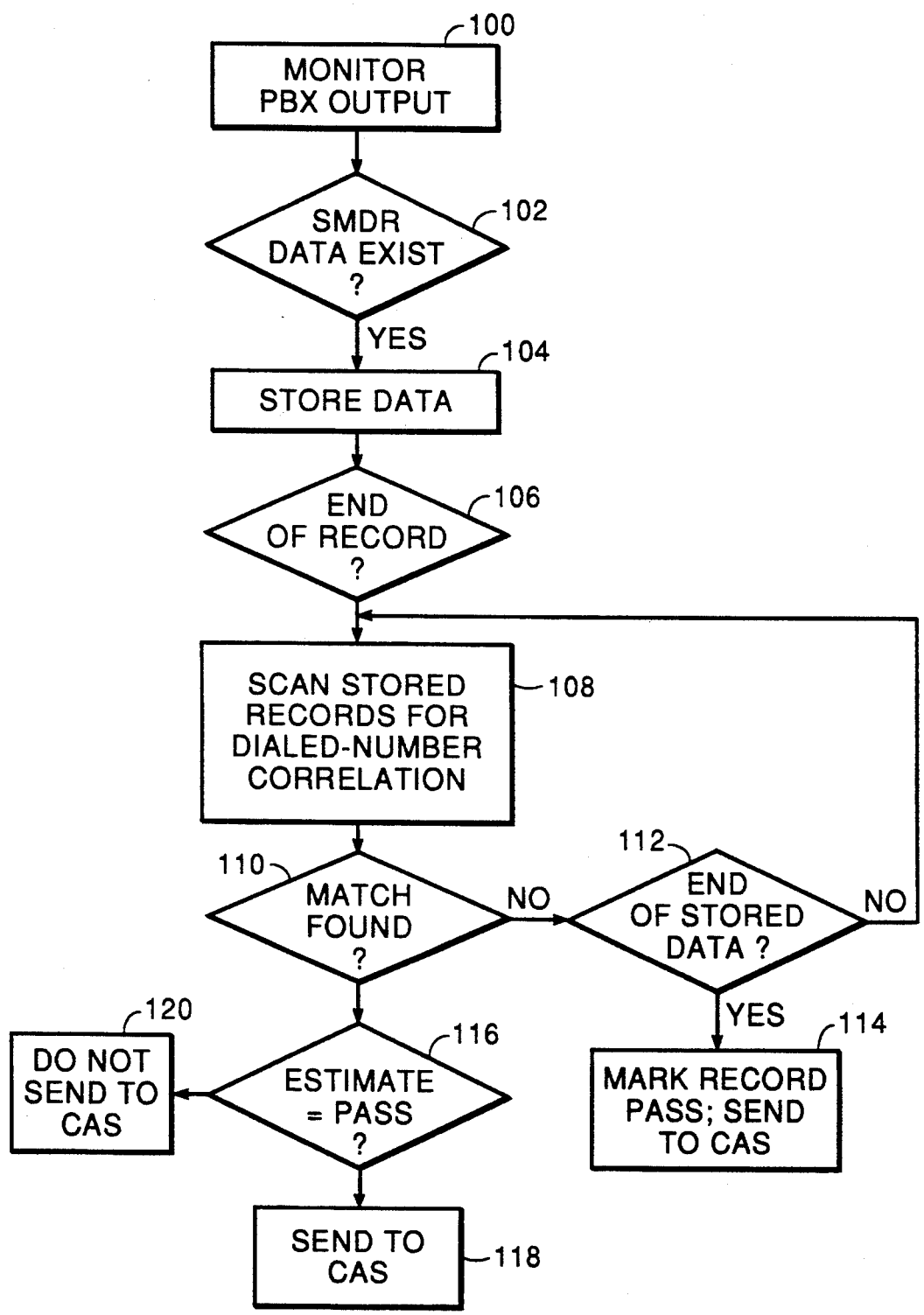
FIG. 6 is a flow chart of the SMDR-forwarding routine that the analyzer follows.

We describe this aspect of the invention in connection with FIG. 6, which is a flow chart that represents the routine for selectively forwarding to the call-accounting system SMDRs received from the PBX. Block 100 of FIG. 6 represents receiving data from the PBX. At the physical, individual-symbol level, the data-transmission format is fairly standard among PBXs from different suppliers, complying with the RS-232C specifications. Additionally, SMDRs from all PBXs start with either ASCII character value 2 or 10 and end with either ASCII character value 3 or 13, so the beginning and end of each record, and the transmitted symbols within the record, can be determined without any knowledge of the particular PBX type or its SMDR format. If the PBX is transmitting SMDR data, as is indicated by a positive result of test 102, the call-disposition analyzer stores the data, as block 104 indicates, and it determines whether the data now stored represent a complete record, as block 106 indicates.

If not, accumulation of data continues until a complete record has been compiled, at which point the compiled SMDR is scanned for correlation with any of the telephone numbers that have been stored in accordance with step 80 of FIG. 4B but have not matched previous SMDRs. That is, the routine searches for a correlation between stored telephone numbers and equal-length sequences in the SMDR regardless of the trunk on which the recorded telephone number was monitored.

The type of correlation is not critical. One type of correlation approach matches each recorded telephone number against each similar-sized sequence of record characters, or at least against all record sequences that represent ASCII numerals as opposed to ASCII letters or other ASCII symbols. For each such sequence of characters in the record, a so-called Gestalt comparison is made: the disposition analyzer looks not only for exact matches but also for sequences that are, for instance, within a maximum Hamming distance from any stored telephone number.

Block 108 represents comparing a stored telephone number with every same-length sequence, in the SMDR and finding the sequence whose Hamming distance (for instance) from that telephone number is the lowest. Block 110 represents determining whether that distance is low enough to consider a match to have been found.

If no match has been found with the current telephone number, the call-disposition analyzer determines whether any further stored telephone numbers remain, as block 112 indicates. If none remain, then the system has not been able to identify the SMDR as being associated with a call for which it has stored a call-disposition estimate. In the illustrated embodiment, the result is that the SMDR is forwarded to the call-accounting system: the illustrated system allows charges to be made for all calls that it has not determined to be failures. Of course, alternate embodiments can operate differently, withholding the SMDR in such a situation so as to forward only calls that it estimates to have been completed, for example.

If step 112 determines that the telephone-number store has not been exhausted, step 108 is repeated for the next telephone number, and this process continues until the telephone-number store has been exhausted or a match has been found. If a match is found, then the SMDR is either forwarded or not in accordance with the disposition estimate for which the matched telephone number is a tag, as blocks 116, 118, and 120 of FIG. 6 indicate.

The call-disposition analyzer of the present invention thus operates without requiring any knowledge of the PBX type with which it is employed or the SMDR format that the PBX uses. It can thus be implemented in relatively inexpensive apparatus and thus constitutes a significant advance in the art.

What is claimed is:

1. A call-disposition analyzer comprising:
   A) a trunk monitor, adapted for connection to a trunk line of a private branch exchange, for monitoring the signals carried by the trunk line and generating a monitor signal representative thereof;
   B) an analysis circuit, connected to receive the monitor signal, for identifying therein dialed numbers associated with calls represented thereby, for making estimates of the dispositions of those calls, and for storing each estimate thus made together with a tag representing at least part of the dialed number identified for the call whose disposition it estimates; and
   C) an SMDR-forwarding circuit, adapted to be interposed in a communication link between the private branch exchange and a call-accounting system, for receiving from the private branch exchange SMDRs that represent calls made over the private branch exchange and include therein the dialed numbers associated with the calls that they represent, scanning a plurality of number sequences in each SMDR to find any such number sequence that matches a tag stored with a disposition estimate, fetching for each received SMDR the disposition estimate whose tag represents at least part of the number sequence thereby found, and selectively forwarding the SMDRs to the call-accounting system in a manner that depends on the disposition estimates respectively fetched for them.

2. A call-disposition analyzer as defined in claim 1 wherein the SMDR-forwarding circuit forwards to the call-accounting system SMDRs for only those calls whose call-disposition estimates indicate that they have been completed.

3. A call-disposition analyzer as defined in claim 2 wherein the call-disposition estimate for a given call is a binary indication of whether the analysis circuit has inferred that the given call has been completed.

4. A call-disposition analyzer comprising:
   A) a current sensor, adapted for connection to a trunk line of a private branch exchange, for generating a monitor signal indicative of the current that flows in the trunk line, the current sensor including:
      i) a passive electrical-to-optical converter, adapted to be interposed in the trunk line, for generating light whose intensity is indicative of the current flowing in the trunk line, the electrical-to-optical converter including:
         a) a light-emitting diode adapted to be interposed in the trunk line; and
         b) a variable load connected in parallel with the light-emitting diode and responsive to the light-emitting-diode current to draw enough current to limit the DC component of the light-emitting-diode current to a predetermined maximum value and thereby stabilize the operating point of the light-emitting diode when the trunk current exceeds the predetermined maximum value; and
      ii) an optical-to-electrical converter, electrically isolated from the electrical-to-optical converter, for generating the monitor signal in response to the light generated thereby;
   B) an analysis circuit, connected to receive the monitor signal, for making estimates therefrom of the dispositions of calls represented thereby and storing the disposition estimates thus made; and
   C) an SMDR-forwarding circuit, adapted to be interposed in a communication link between the private branch exchange and a call-accounting system and responsive to the stored disposition estimates, for receiving from the private branch exchange SMDRs that represent calls made over the private branch exchange and forwarding them to the call-accounting system in a manner that depends on their respective calls' disposition estimates.

5. A call-disposition analyzer as defined in claim 4 wherein the variable load comprises:
   A) a current-sensing resistor connected in series with the light-emitting diode; and
   B) a transistor whose emitter-collector circuit is connected in parallel with the series combination of the light-emitting diode and the current-sensing resistor and whose emitter is coupled to the junction of the light-emitting diode and the current-sensing resistor so that the current that the transistor conducts is controlled by the magnitude of the current that flows through the light-emitting diode.

6. In a private telephone network, a combination comprising:
   A) at least one trunk line providing communication with the public telephone network;
   B) a private branch exchange for selectively connecting the trunk line to lines in the private network and generating SMDRs that represent calls made over the private branch exchange and include therein the dialed numbers associated with the calls that they represent;

C) a call-accounting system;

D) a communications link for conducting SMDRs from the private branch exchange to the call-accounting system;

E) a trunk monitor, adapted for connected to each trunk line, for monitoring the signals carried by the trunk line and generating a monitor signal representative thereof;

F) an analysis circuit, connected to receive the monitor signal, for identifying therein dialed numbers associated with calls represented thereby, for making estimates of the dispositions of those calls, and for storing each estimate thus made together with a tag representing at least part of the dialed number identified for the call whose disposition it estimates; and G) an SMDR-forwarding circuit, interposed in the communication link between the private branch exchange and the call-accounting system, for receiving the SMDRs, scanning a plurality of number sequences in each SMDR to find any such number sequence that matches a tag stored with a disposition estimate, fetching for each received SMDR the disposition estimate whose tag represents at least part of the number sequence thereby found, and selectively forwarding the SMDRs to the call-accounting system in a manner that depends on the disposition estimates respectively fetched for them.

7. A call-disposition analyzer as defined in claim 6 wherein the SMDR-forwarding circuit forwards to the call-accounting system SMDRs for only those calls whose call-disposition estimates indicate that they have been completed.

8. A call-disposition analyzer as defined in claim 7 wherein the call-disposition estimate for a given call is a binary indication of whether the analysis circuit has inferred that the given call has been completed.

9. In a private telephone network, a combination comprising:

A) at least one trunk line providing communication with the public telephone network;

B) a private branch exchange for selectively connecting the trunk line to lines in the private network and generating SMDRs that represent calls made over the private branch exchange and include therein the dialed numbers associated with the calls that they represent;

C) a call-accounting system;

D) a communications link for conducting SMDRs from the private branch exchange to the call-accounting system;

E) a current sensor connected to each trunk for generating a monitor signal indicative of the current that flows in the trunk line, the current sensor including:

i) a passive electrical-to-optical converter interposed in the trunk line for generating light whose intensity is indicative of the current flowing in the trunk line, the electrical-to-optical converter including:

a) a light-emitting diode adapted to be interposed in the trunk line; and b) a variable load connected in parallel with the light-emitting diode and responsive to the light-emitting-diode current to drawn enough current to limit the DC component of the light-emitting-diode current to a predetermined maximum value and thereby stabilize the operating point of the light-emitting diode when the trunk current exceeds the predetermined maximum value; and ii) an optical-to-electrical converter, electrically isolated from the electrical-to-optical converter, for generating the monitor signal in response to the light generated thereby;

F) an analysis circuit, connected to receive the monitor signal, for identifying therein dialed numbers associated with calls represented thereby, for making estimates of the dispositions of those calls, and for storing each estimate thus made together with a tag representing at least part of the dialed number identified for the call whose disposition it estimates; and G) an SMDR-forwarding circuit, interposed in the communication link between the private branch exchange and the call-accounting system, for receiving the SMDRs, fetching for each received SMDR the disposition estimate whose tag represents at least part of the dialed number contained by that SMDR, and selectively forwarding the SMDRs to the call-accounting system in a manner that depends on the disposition estimates respectively fetched for them.

10. A call-disposition analyzer as defined in claim 9 wherein the variable load comprises:

A) a current-sensing resistor connected in series with the light-emitting diode; and B) a transistor whose emitter-collector circuit is connected in parallel with the series combination of the light-emitting diode and the current-sensing resistor and whose emitter is coupled to the junction of the light-emitting diode and the current-sensing resistor so that the current that the transistor conducts is controlled by the magnitude of the current that flows through the light-emitting diode.

* * * * *